(12) United States Patent
Bagheri et al.

(10) Patent No.: US 8,463,637 B2
(45) Date of Patent: Jun. 11, 2013

(54) AUTOMATED ALLOCATION OF RESOURCES TO FUNCTIONAL AREAS OF AN ENTERPRISE ACTIVITY ENVIRONMENT

(75) Inventors: Saeed Bagheri, Croton on Hudson, NY (US); Jarir K. Chaar, Tarrytown, NY (US); Yi-Min Chee, Yorktown Heights, NY (US); Krishna C. Ratakonda, Yorktown Heights, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 12/868,049

(22) Filed: Aug. 25, 2010

(65) Prior Publication Data

US 2012/0054764 A1   Mar. 1, 2012

(51) Int. Cl.
*G06Q 10/00*     (2006.01)
(52) U.S. Cl.
USPC ........................................................ 705/7.14
(58) Field of Classification Search
USPC ........................................................ 705/7.14
See application file for complete search history.

(56) References Cited

U.S. PATENT DOCUMENTS

| | | | |
|---|---|---|---|
| 6,249,715 B1 * | 6/2001 | Yuri et al. | 700/111 |
| 6,578,005 B1 * | 6/2003 | Lesaint et al. | 705/7.14 |
| 6,859,523 B1 * | 2/2005 | Jilk et al. | 379/32.01 |
| 7,325,056 B2 | 1/2008 | Srivastava et al. | |
| 7,512,931 B2 * | 3/2009 | Schmit | 717/105 |
| 7,584,113 B2 | 9/2009 | Denton et al. | |
| 7,650,400 B2 | 1/2010 | Ng et al. | |
| 2006/0080413 A1 | 4/2006 | Oprea et al. | |
| 2006/0173724 A1 | 8/2006 | Trefler et al. | |
| 2007/0203778 A1 | 8/2007 | Lowson et al. | |

OTHER PUBLICATIONS

H. Levine, "How to Allocate Resources and Build Optimal Project Teams", Attask, Inc. pp. 1-3, 2010.
"Microsoft Project 2010—Microsoft Enterprise Project Management (EPM) Solution", Microsoft Corp., pp. 1-11, 2010.
"Resource Management With VMware DRS", VMware, White Paper, pp. 1-4, 2008.

\* cited by examiner

*Primary Examiner* — Romain Jeanty
(74) *Attorney, Agent, or Firm* — John R. Pivnichny; Law Office of Jim Boice (57) ABSTRACT

A computer implemented method, system and/or computer program product automatically allocate resources to functional areas of an enterprise activity environment. A skill level of a resource is determined for multiple functional areas. A unique ramp-up index is associated with each of the multiple functional areas. An affinity index is associated with each of the multiple functional areas, wherein the affinity index is based on a level of productivity drop of other resources in a specific functional area if the resource is assigned to another functional area. Expected resource and skill level requirements of a project are identified, and a cohesion index is defined. The cohesion index measures the disruption that may result from adding the resource to or removing the resource from a functional area. The resource is automatically allocated to one or more functional areas based on the unique ramp-up index, the cohesion index, and the affinity index associated with a particular functional area in view of the expected resource and skill level requirements.

20 Claims, 8 Drawing Sheets

AUTOMATED ALLOCATION OF RESOURCES TO FUNCTIONAL AREAS OF AN ENTERPRISE ACTIVITY ENVIRONMENT

BACKGROUND

The present disclosure relates to the field of computers, and specifically to the use of computers in allocating resources. Still more particularly, the present disclosure relates to the use of computers to allocate resources to functional areas of an activity environment.

BRIEF SUMMARY

A computer implemented method, system and/or computer program product automatically allocate resources to functional areas of an enterprise activity environment. A skill level of a resource is determined for multiple functional areas. A unique ramp-up index is associated with each of the multiple functional areas, wherein each unique ramp-up index is based on a rate of growth of the skill level for the resource as a function of time spent to develop a requisite skill level of the resource within each functional area. An affinity index is associated with each of the multiple functional areas, wherein the affinity index is based on a level of productivity drop of other resources in a specific functional area if the resource is assigned to another functional area. Expected resource and skill level requirements of a project are identified, and a cohesion index is defined. The cohesion index measures the disruption that may result from adding the resource to or removing the resource from a functional area. The resource is automatically allocated to one or more functional areas based on the unique ramp-up index, the cohesion index, and the affinity index associated with a particular functional area in view of the expected resource and skill level requirements.

DETAILED DESCRIPTION

As will be appreciated by one skilled in the art, some or all of the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some or all of the features described in the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

As described herein, one embodiment of the present disclosure relates to capacity planning and resource management, and more particularly to a method for generating an automated optimal scheduling under requirements of existence of sticky functional area skills and necessity of different treatment for highly productive resources.

Capacity planning and resource management simultaneously automate and optimize various aspects of service offerings. One problem associated with dynamic capacity planning can be formulated using Equation (1):

$$x(t)^* = \operatorname*{argmin}_{c_i(x(t_j)) \geq 0} f(x(t-1), \ldots x(0)) \qquad \text{Equation (1)}$$

where x is the decision vector, t is time, f is the objective and $c_i(x(t_j))$ are the $i^{th}$ constraints at time j.

The present disclosure utilizes a reformulation of Equation (1) (shown below as Equation (2)) in such a way that it is both a "fair" representative of the problem (of optimizing capacity planning) and "straight-forward" to solve.

In one embodiment of the present disclosure, a software factory is utilized as an enterprise activity environment in which resources are to be allocated in accordance with parameters described herein. A software factory establishes a disciplined approach to leveraging global resources for application development and maintenance activities. As described herein, resources with similar skills are pooled by functional area(s) and geographically organized into assembly centers. Resources in an assembly center may have skills that enable them to work in other functional areas/move to other assembly centers. A resource allocated to multiple functional areas has a primary functional area. In the present disclosure, attention is paid to managing the allocation of resources to primary functional areas by taking into account both short term and long term consequences.

Described herein is a software factory, which includes a collection of business and Information Technology (IT) governance models, operational models, delivery methods, metrics, environment and tools bundled together to improve the quality of delivered software systems, control cost overruns, and effect timely delivery of such systems. The software factory described herein offers a practical solution to developing software systems using multiple sites that are geographically distributed. The issues of varying time zones and the hand-over between various teams residing in such time zones are handled by exchanging work packets. A work packet is a self-contained work unit that is composed of processes, roles, activities, applications and the necessary input parameters that allow a team to conduct a development activity in a formalized manner with visibility to progress of their effort afforded to requesting teams.

The software factory described herein is a uniquely engineered scalable efficiency model construct that transforms a traditional software development art form into a repeatable scientific managed engineered streamline information supply chain. The software factory incorporates applied system and industrial engineering quality assured efficiencies that provide for the waste eliminating, highly optimized performed instrumentation, measured monitoring and risk mitigated management of software development.

Software Factory Overview

Figure 1:
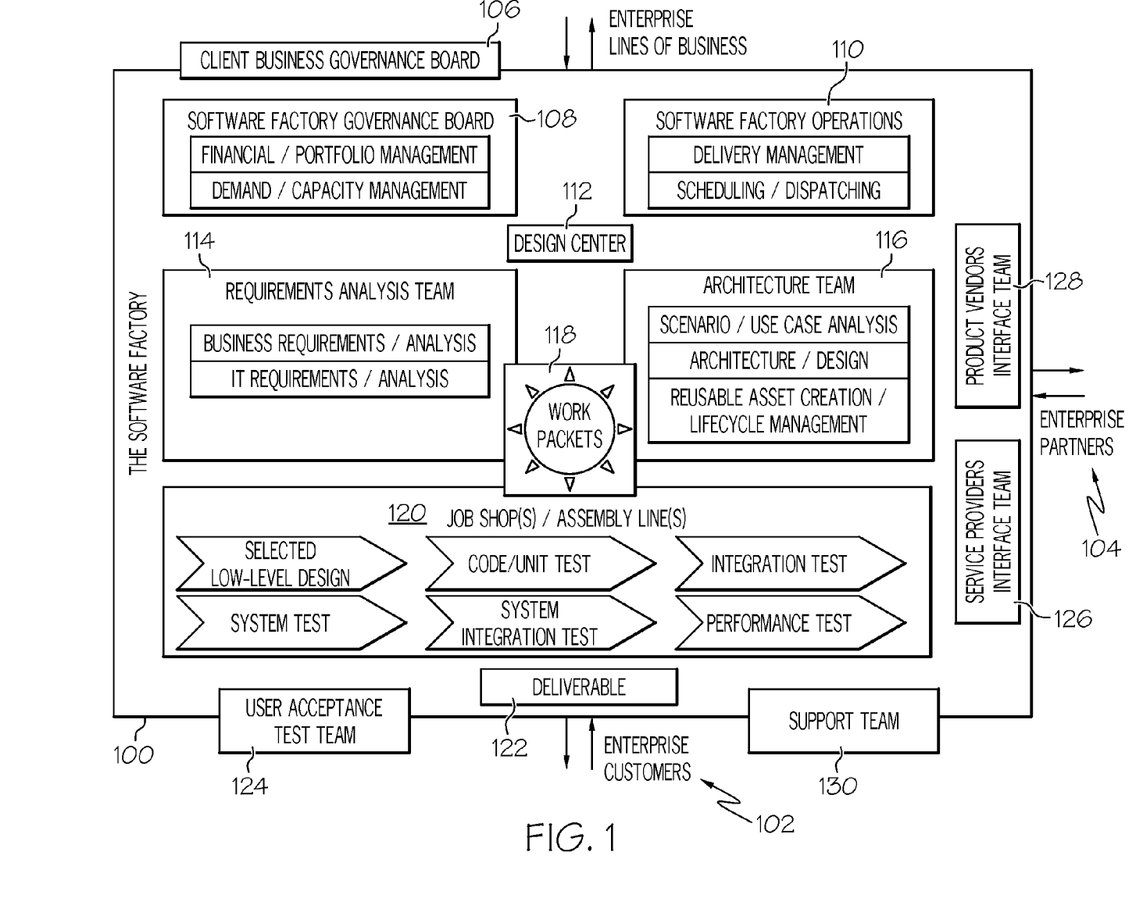
FIG. 1 is an overview of a software factory that may be used in one embodiment of the present disclosure.

With reference now to the figures, and in particular to FIG. 1, an overview of a preferred embodiment of a software factory 100 is presented. As depicted, the software factory 100 is a service that interacts with both enterprise customers (i.e., client customers) 102 as well as enterprise partners (i.e., third party vendors) 104. The primary human interface with the enterprise customers 102 is through a Client Business Governance Board (CBGB) 106. CBGB 106 represents client stakeholders and client business sponsors that fund a project of the software factory 100. CBGB 106 can be an internal or external client. That is, the same enterprise (i.e., internal client) may include both CBGB 106 and software factory 100, or a first enterprise (i.e., external client) may have CBGB 106 while a second enterprise has the software factory 100. As described in greater detail below, a project proposal definition is then run through a software factory induction process in a Software Factory Governance Board (SFGB) 108 and Software Factory Operations (SFO) 110, where the project proposal definition is evaluated, qualified, scored and categorized. The project proposal definition is then subject to a System Engineering Conceptual Requirements Review by the SFGB 108. Based on the outcome of the review by the SFGB 108, a decision is made to accept the project proposal definition or to send it back to the CBGB 106 for remediation and resubmission through the Software Factory Induction Process.

Thus, Software Factory Governance, which includes SFGB 108 and SFO 110, provides the guidance, constraints, and underlying enforcement of all the factory policies and procedures, in support of their governing principles in support of the strategic objects of the Software Factory 100. Software Factory governance consists of factory business, IT and operations governance. The principles, policies and procedures of these models are carried out by two governing bodies—the Business Governance Board and the IT Governance Board (both part of SFGB 108), and an enforcement body—the Software Factory Operations 110.

Thus, Software Factory Governance is responsible for:
Business and IT strategic planning;
Assuring that Business and IT strategies are aligned;
Setting Goals;
Monitoring those goals;
Detecting problems in achieving those goals;
Analyzing Problems;
Identifying Reasons;
Taking Action;
Providing Feedback; and
Re-Strategizing (Continue process improvement).

As soon as a project is deemed worthy to proceed, the job of creating the custom software is sent to a Design Center 112, where the project is broken into major functional areas, including those handled by a Requirements Analysis Team 114 and an Architectural Team 116.

The Requirements Analysis Team 114 handles the Requirement Management side of the Design Center 112, and is responsible for collecting the business requirements from the lines of business and populating these requirements into the tools. Analysis of business requirements is also carried out in order to derive associated IT requirements. Some requirements (e.g. system requirements) may have a contractual constraint to use a certain infrastructure. Requirements are analyzed and used in the basis for business modeling. These requirements and representative business (contextual, event and process models) are then verified with and signed off from project stakeholders. Requirements are then base-lined and managed within release and version control.

The Architectural Side of the Design Center 112 is handled by the Architecture Team 116, which takes the output of the requirement/analysis/management side of the design center, and uses architectural decision factors (functional requirements, non-functional requirements, available technology, and constraints), to model a design with appropriate example representation into detail design specification, that is bundled with other pertinent factors into a work packet for assembly lines to execute.

Work Packets 118 are reusable, self-contained, discrete units of software code that constitute a contractual agreement that governs the relationship among Design Center 112, Software Factory Governance Board 108, Software Factory Operations 110, and Assembly Line 120. That is, each work packet 118 includes governance policies and procedures (e.g., including instructions for how work reports are generated and communicated to the client), standards (e.g., protocol for the work packet 118), reused assets (e.g., reusable blocks of code, including the requirements, instructions and/or links/pointers associated with those reusable blocks of code), work packet instructions (e.g., instructions for executing the work packet 118), integration strategy (e.g., how to integrate the work packet 118 into a client's security system), schedule (e.g., when deliverables are delivered to the client), exit criteria (e.g., a checklist for returning the work packet 118 and/or deliverables to the software factory 100), and Input/Output (I/O) work products (e.g., artifact checklist templates for I/O routines).

Assembly Line(s) 120 which are part of a Job Shop, include, but are not limited to any team that is initialized, skilled and certified to accept application factory work packets from the factory Design Center 112. Job Shops receive and execute the work packets 118, which are specified by the Design Center 112, to create a customized deliverable 122. As shown in exemplary manner, the assembly line 120 puts the work packets 118 into a selected low-level design to generate a deliverable (executable product). While assembly line 120 can be a manual operation in which a coding person assembles and tests work packets, in another embodiment this process is automated using software that recognizes project types, and automatically assembles work packets needed for a recognized project type.

Various tests can be performed in the assembly line 120, including code/unit tests, integration test, system test, system integration test, and performance test. "Code/unit test" tests the deliverable for stand-alone bugs. "Integration test" tests the deliverable for compatibility with the client's system. "System test" checks the client's system to ensure that it is operating properly. "System integration test" tests for bugs that may arise when the deliverable is integrated into the client's system. "Performance test" tests the deliverable as it is executing in the client's system. Note that if the deliverable is being executed on a service provider's system, then all tests described are obviously performed on the service provider's system rather than the client's system.

A User Acceptance Test Team 124 includes a client stakeholder that is charged with the responsibility of approving acceptance of deliverable 122.

Software factory 100 may utilize enterprise partners 104 to provide human, hardware or software support in the generation, delivery and/or support of deliverables 122. Such third party contractors are viewed as a resource extension of the software factory 100, and are governed under the same guidelines described above.

If an enterprise partner 104 is involved in the generation of work packets 118 and/or deliverables 122, an interface between the software factory 100 and the enterprise partner 104 may be provided by a service provider's interface team 126 and/or a product vendor's interface team 128. Service provided by an enterprise partner 104 may be a constraint that is part of contractual agreement with a client to provide specialized services. An example of such a constraint is a required integrated information service component that is referenced in the integration design portion of the work packet 118 that is sent to assembly line 120. Again, note that third party service providers use a standard integration strategy that is defined by the software factory 100, and, as such, are subject to and obligated to operate under software factory governance.

Product vendor's interface team 128 provides an interface with a Product Vendor, which is an enterprise partner 104 that provides software factory 100 with supported products that maybe used within a software factory solution. Product Vendors are also responsible for providing product support and maintaining vendor's relationships, which are managed under the software factory's governance guidelines.

Support Team 130 includes both Level 2 (L2) support and Level 1 (L1) support.

L2 Support is provided primarily by Software Engineers, who provide problem support of Software Factory produced delivered code for customers. That is, if a deliverable 122 doesn't run as designed, then the software engineers will troubleshoot the problem until it is fixed. These software engineers deliver technical assistance to Software Factory customers with information, tools, and fixes to prevent known software (and possibly hardware) problems, and provide timely responses to customer inquiries and resolutions to customer problems.

L1 support is primarily provided by an L1 Help Desk (Call Center). L1 Help Desk support can be done via self-service voice recognition and voice response, or by text chat to an automated smart attendant, or a call can be directed to a Customer Service Representative (CSR). Customer Service Representatives in this role provide first line of help problem support of Software Factory produced deliverables. Such help includes user instruction of known factory solution procedures. For any related customers issues that cannot be resolved through L1, the L1 Help Desk will provide preliminary problem identification and create trouble ticket entry into trouble tracking system, which then triggers a workflow event to dynamically route the problem issue to an available and appropriate L2 support group queue.

Figure 2:
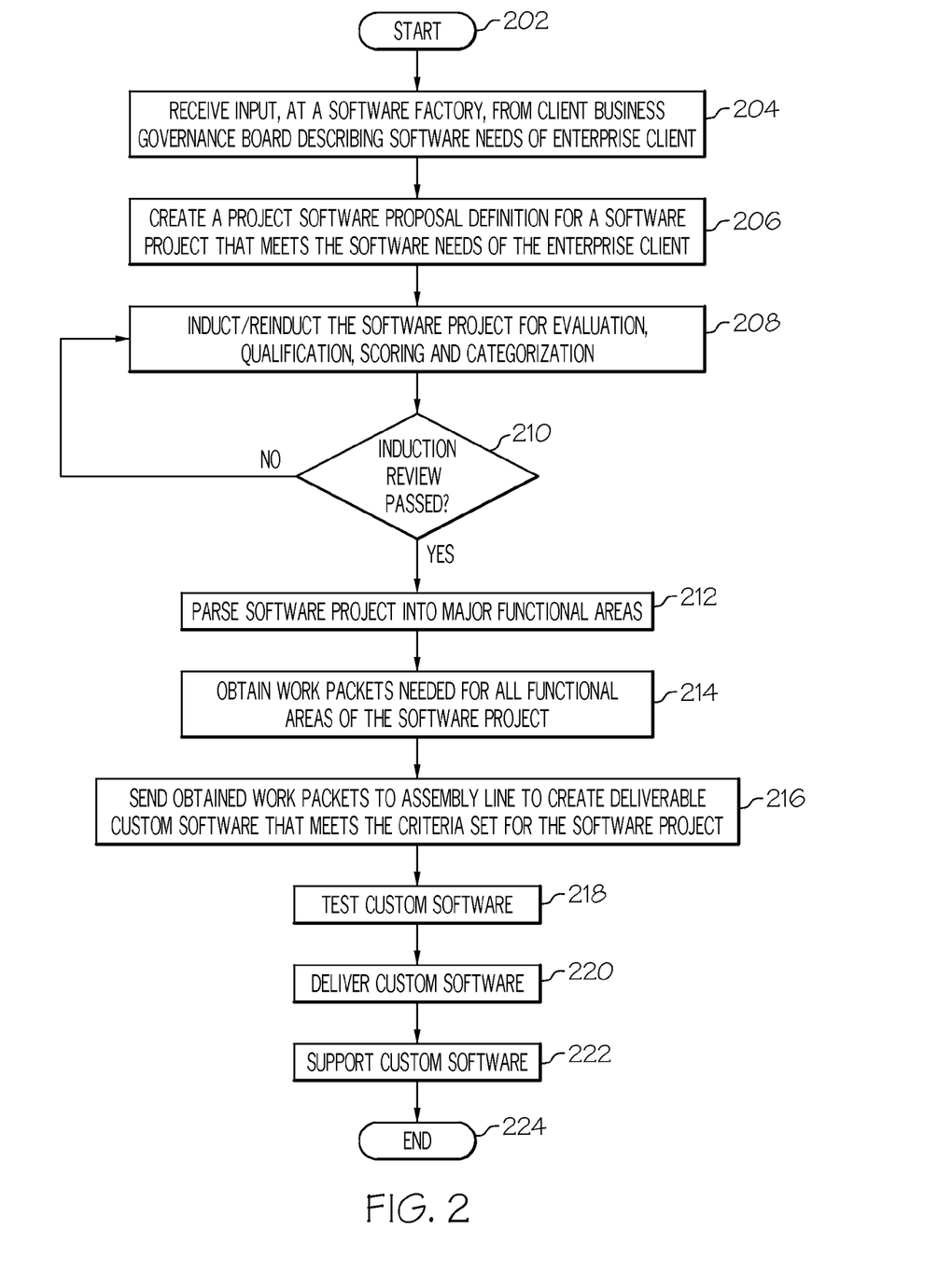
FIG. 2 is a flow-chart of steps taken to create custom software through the use of work packets in a software factory.

With reference now to FIG. 2, a flow-chart of exemplary steps taken to create custom software through the use of a software factory is presented. After initiator block 202, which may be a creation of a contract between an enterprise client and a software factory service, input, from a Client Business Governance Board, is received at a software factory (block 204). This input is a detailed description of the custom software needs of the enterprise client. While such input is usually prepared and presented by human management of the enterprise client, alternatively this input may be the creation of a Unified Modeling Language (UML) based description of the needed software. Based on the client's input, a project software proposal definition is created by the Software Factory Governance Board of the software factory (block 206). This project software proposal definition is sent to the scheduling/dispatching department of the Software Factory Operations, which creates a software project.

The software project is then inducted (block 208). As will be described in more detail below, the project induction provides an initial introduction of the project to the software factory. Through the use of various parameters, including those found in records of other projects, checklists, et al., the project is initially evaluated. This evaluation includes determining if the software factory has the capacity, resources, bandwidth, etc. needed for the project. If so, then a determination is made as to whether the project is qualified for acceptance by the software factory. Such qualification includes, but is not limited to, determining if the project falls within the guidelines set by a Service Level Agreement (SLA) between the client enterprise and the software factory, whether the project conforms to legal guidelines such as Sarbanes-Oxley, etc. Based on these and other criteria, the project is scored for feasibility, profitability, and desirability for implementation. If the induction process concludes that the project should proceed, then it is categorized into a particular type of project (e.g., payroll, inventory control, database management, marketing, et al.).

If the induction process does not pass (query block 210), indicating that the project should not proceed, then the project is returned to the Client Business Governance Board for additional discussions between the Client Business Governance Board and the software factory, in order to induct a revised project (i.e., reinduct the software project). However, if the induction process passes, then the software project is parsed into major functional areas (block 212). That is, the project is divided up ("broken apart") in order to establish subunits that can later be integrated into a single custom software ("deliverable").

Work packets are then obtained for all of the functional areas of the software project (block 214). These work packets are reusable components which are described in detail below. The work packets are then stitched together (block 216) on an assembly line to create deliverable custom software that meets the criteria for the software project that has been established in the earlier steps. The custom software is then tested in the software factory (block 218). Once testing is completed, the custom software is delivered (block 220) to the client customer, who receives on-going support from the support team (block 222). The flow-chart ends at terminator block 224.

While the process has been described for the creation of custom software, the same process is used by a software factory for other activities, including creating a service for a customer, creating standardized software, etc. Thus, the software factory uses work packets to blend software (including reusable artifacts), protocols (e.g., how software will be transmitted, how individuals will be contacted, etc.), governance requirements (e.g., service level agreements that describe how much a service will cost) and operating environments (hardware and software, including operating systems, integrated environments such as SAP™, Rational™, etc.) into a single integrated product, which can then be used in a stand-alone manner or can be fed into another system/product.

Note that software factory 100 is virtual. That is, the different components (e.g., software factory governance board 108, software factory operations 110, design center 112, assembly line 120) may be located in different locations, and may operate independently under the control of information found in work packets 118. In a preferred embodiment, each of the different components of the software factory 100 publishes a set of services that the component can provide and a set of requirements for using these services. These services are functions that are well defined and made visible for outside entities to call.

For example, assume that assembly line 120 publishes a service that it can assemble only work packets that include code and protocol that utilize IBM's Rational™ software development platform. Thus, the assembly line 120 has published its service (set of services includes "assembling work packets") and the required protocol (set of requirements includes "utilize IBM's Rational™ software development platform") to the design center 112, which must decide if it wants (or is able) to utilize that particular assembly line 120. If not, then another assembly line from another software factory may be called upon by the design center 112. Behind each offered service are the actual processes that a component performs. These processes are steps taken by the service. Each step is performed by a section of software, or may be performed by an individual who has been assigned the task of performing this step. Each step utilizes leveraged tools, including the work packets 118 described herein. These work packets 118 then implement the process.

By utilizing published interfaces between the different components of the software factory 100, then different components from different software factories can be interchanged according to the capability offered by and protocol used by each component. This enables a "building block" architecture to be implemented through the use of different components from different software factories.

Life Cycle of a Work Packet

Figure 3:
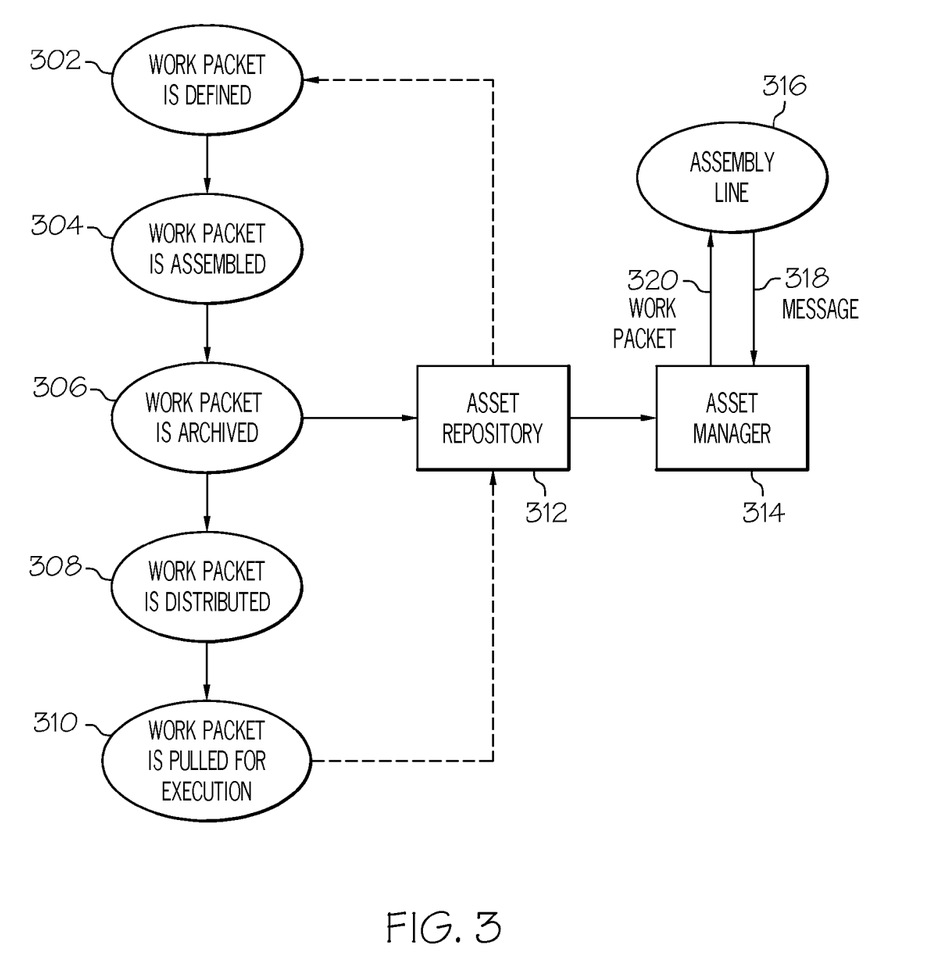
FIG. 3 presents an overview of the life cycle of work packets.

There are five phases in the life cycle of a work packet, which are shown in FIG. 3. These five phases are 1) Defining (block 302); 2) Assembling (block 304); Archiving (block 306); Distributing (block 308); and Pulling for Execution (block 310). As indicated by the top dashed line coming out of asset repository 312, this life cycle may be recursive. That is, in one embodiment, work packets are modified and upgraded in a recursive manner, which includes the steps shown in FIG. 3. Once a work packet is assembled and archived, it is stored in an asset repository 312, whence the work packet may be accessed and utilized by an asset manager 314 for assembly into a deliverable by an assembly line 316. Note that the assembly line 316 can also send, to the asset manager 314, a message 318 that requests a particular work packet 320, which can be pulled (block 310) into the asset repository 312 by the asset manager 314. This pulling step (block 310), is performed through intelligent routing distribution (block 308) to the asset repository 312 and assembly line 316. The configuration of the routing distribution of the work packet 320 is managed by the asset manager 314, which is software that indexes, stores and retrieves assets created and used with the software factory.

Work Packet Components

A work packet is a self-contained work unit that comprises processes, roles, activities (parts of the job), applications, and necessary input parameters that allow a team to conduct a development activity in a formalized manner, with visibility to progress of their effort afforded to requesting teams. A work packet is NOT a deliverable software product, but rather is a component of a deliverable software product. That is, a work packet is processed (integrated into a system, tested, etc.) to create one or more deliverables. Deliverables, which were created from one or more work packets, are then combined into a custom software, such as an application, service or system.

In a preferred embodiment, a work packet is composed of the following eight components:

Governance Policies and Procedures—these policies and procedures include protocol definitions derived from a project plan. That is, a project plan for a particular custom software describes how work packets are called, as well as how work packets report back to the calling plan.

Standards—this component describes details about how work packets are implemented into a deliverable in a standardized manner Examples of such standards are naming conventions, formatting protocol, etc.

Reused Assets—this component includes actual code, or at least pointers to code, that is archived for reuse by different assembled deliverables.

Work Packet Instructions—this component describes detailed instructions regarding how a work packet is actually executed. That is, work packet instructions document what work packets need to be built, and how to build them. These instructions include a description of the requirements that need to be met, including design protocols, code formats, and test parameters.

Integration Strategy—this component describes how a set of work packets, as well as deliverables developed from a set of work packets, are able to be integrated into a client's system. This component includes instructions regarding what processes must be taken by the client's system to be prepared to run the deliverable, as well as security protocols that must be followed by the deliverable. The component may also include a description of how one deliverable will interact with other applications that are resident to the client's computer system.

Scheduling—this component describes when a set of work packets are to be sent to an assembly line, plus instructions on monitoring the progress and status of the creation of the work packet.

Exit Criteria—this component includes instructions (e.g., through the use of a checklist) for deploying a deliverable to the client's system. That is, this component is the quality criteria that the deliverable must meet before it can be considered completed and acceptable for a project.

Input Work Products—this component includes Input/Output (I/O) templates that are used to describe specific work products that are needed to execute the activities of the work packet (in the assembly line) to build the deliverable.

Defining a Work Packet

The process of defining a work packet is called a "work packet definition process." This process combines critical references from governance, factory operations (e.g., factory management, project management), business criteria, and design (including test) artifacts. Structured templates enable governance, design center, and factory operations to define the referenced artifacts by filling in corresponding functional domain templates, thus defining the contents of the work packet. Thus, a work packet includes not only reusable software code, but also includes governance and operation instructions. For example, a work packet may include directions that describe a sequence of steps to be taken in a project; which data is to be used in the project; which individuals/departments/job descriptions are to perform each step in the project; how assigned individuals/departments are to be notified of their duties and what steps/data are to be taken and used, et al. Thus, each work packet includes traceability regarding the status of a job, as well as code/data/individuals to be used in the execution of a project.

Thus, work packets are created from unique references to governance, factory operations (factory mgt, project mgt), business, and design (including test) artifacts. The packet definition process provides structure templates that enable governance, design center, and factory operations to define referenced artifacts (newly defined artifact identifiers or any reusable part of existing work packet definitions), by filling in corresponding functional domain (e.g., eXtensible Markup Language—XML) templates. What can be defined may be controlled by a Document Type Definition (DTD). The DTD states what tags and attributes are used to describe content in the deliverable, including where each XML tag is allowed and which XML tags can appear within the deliverable. XML tag values are defined and applied to a newly defined XML template for each functional area of a design center. These XML templates are then merged into one hierarchical structure when later assembled into finalized work packets.

Figure 4:
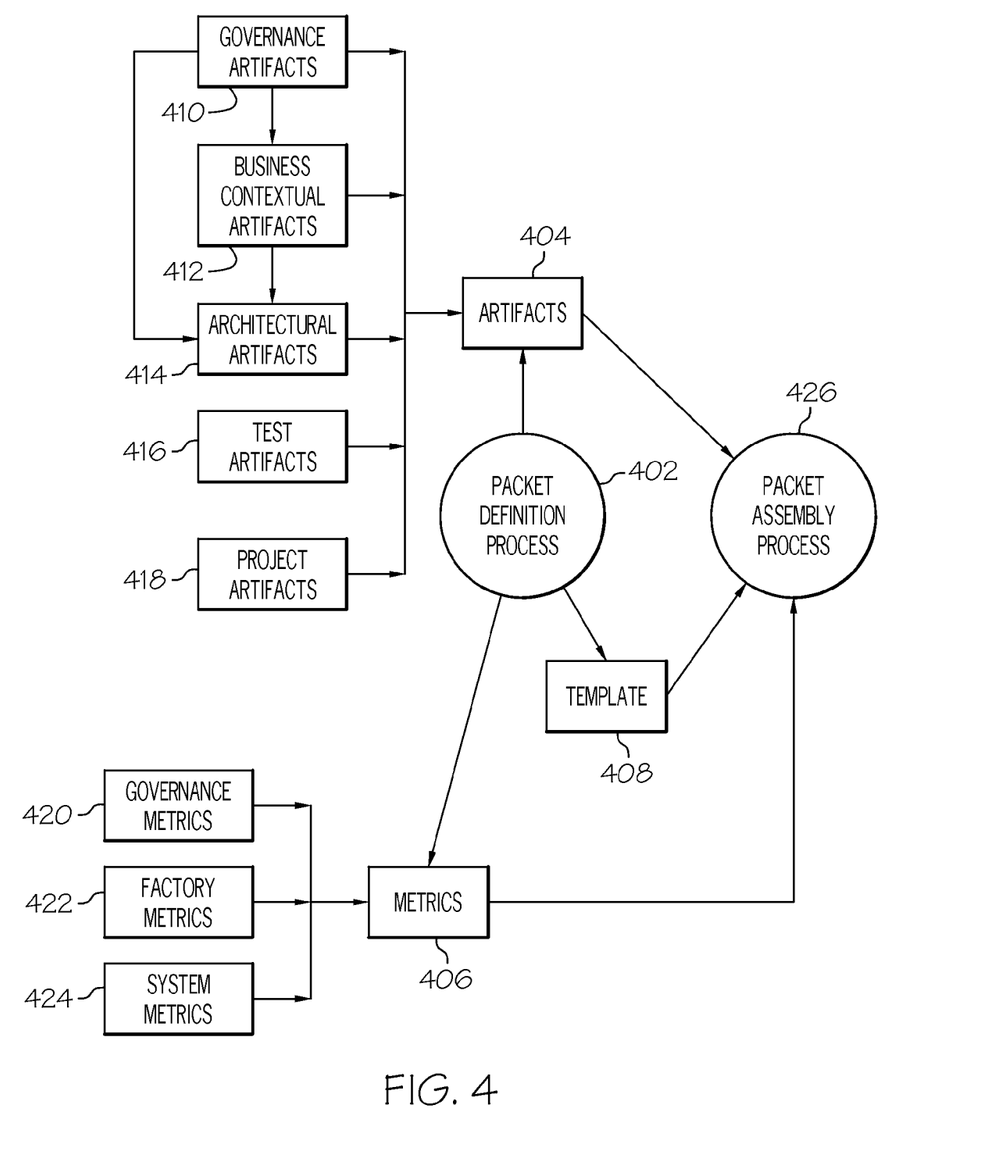
FIG. 4 presents an overview of an environment in which work packets are defined and assembled.

With reference now to FIG. 4, an overview of the environment in which a packet definition process 402 occurs is presented. The packet definition process 402 calls artifacts 404, metrics 406, and a template 408 to define a work packet. The artifacts may be one or more of: governance artifacts 410 (intellectual property assets produced in the software factory by the Software Factory Governance Board 108 described in FIG. 1); business contextual artifacts 412 (intellectual property assets produced in the software factory by business analysts in the requirement analysis team 114 described in FIG. 1); architectural artifacts 414 (intellectual property assets produced by the architecture team 116 described in FIG. 1); test artifacts 416 (intellectual property assets produced by test architects in the architecture team 116 shown in FIG. 1); and project artifacts 418 (intellectual property assets produced in the software factory by system engineers in the design center 112 shown in FIG. 1).

The metrics 406 may be one or more of: governance metrics 420 (measurable governance indicators, such as business plans); factory metrics 422 (measurable indicators that describe the capabilities of the software factory, including assembly line capacity); and system metrics 424 (measurable indicators that describe the capabilities of the client's computer system on which deliverables are to be run).

Based on a template 408 for a particular deliverable, artifacts 404 and metrics 406 are used by a packet assembly process 426 to assemble one or more work packets.

Assembling a Work Packet

Template 408, shown in FIG. 4, describes how a work packet is to be assembled. The template 408 includes metadata references to key artifacts 404 and metrics 406, which are merged into a formal work packet definition as described above. The work packet is then assembled in a standardized hierarchical way and packaged within a factory message envelope that contains a header and body.

Figure 5:
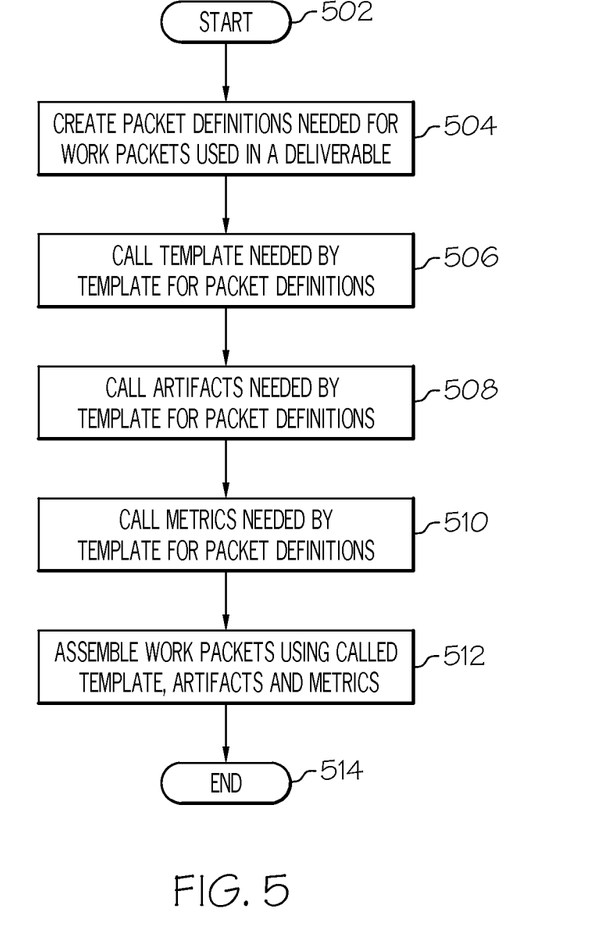
FIG. 5 is a high-level flow-chart of steps taken to define and assemble work packets.

With reference now to FIG. 5, a high-level flow-chart of steps taken to define and assemble work packets is presented. After initiator block 502 (which may be an order by the Requirements Analysis Team 114 to the Architecture Team 116, shown in FIG. 1, to create a design center-defined work packet), the requisite packet definitions are created for work packets that are to be used in deliverables (block 504). First, a template, which preferably is a reusable that has been used in the past to create the type of work packet needed, is called (block 506). Based on that called template, the needed artifacts (block 508) and metrics (block 510) are called. Using the template as a guide, the called artifacts and metrics are assembled in the requisite work packets (block 512), and the process ends.

Figure 6:
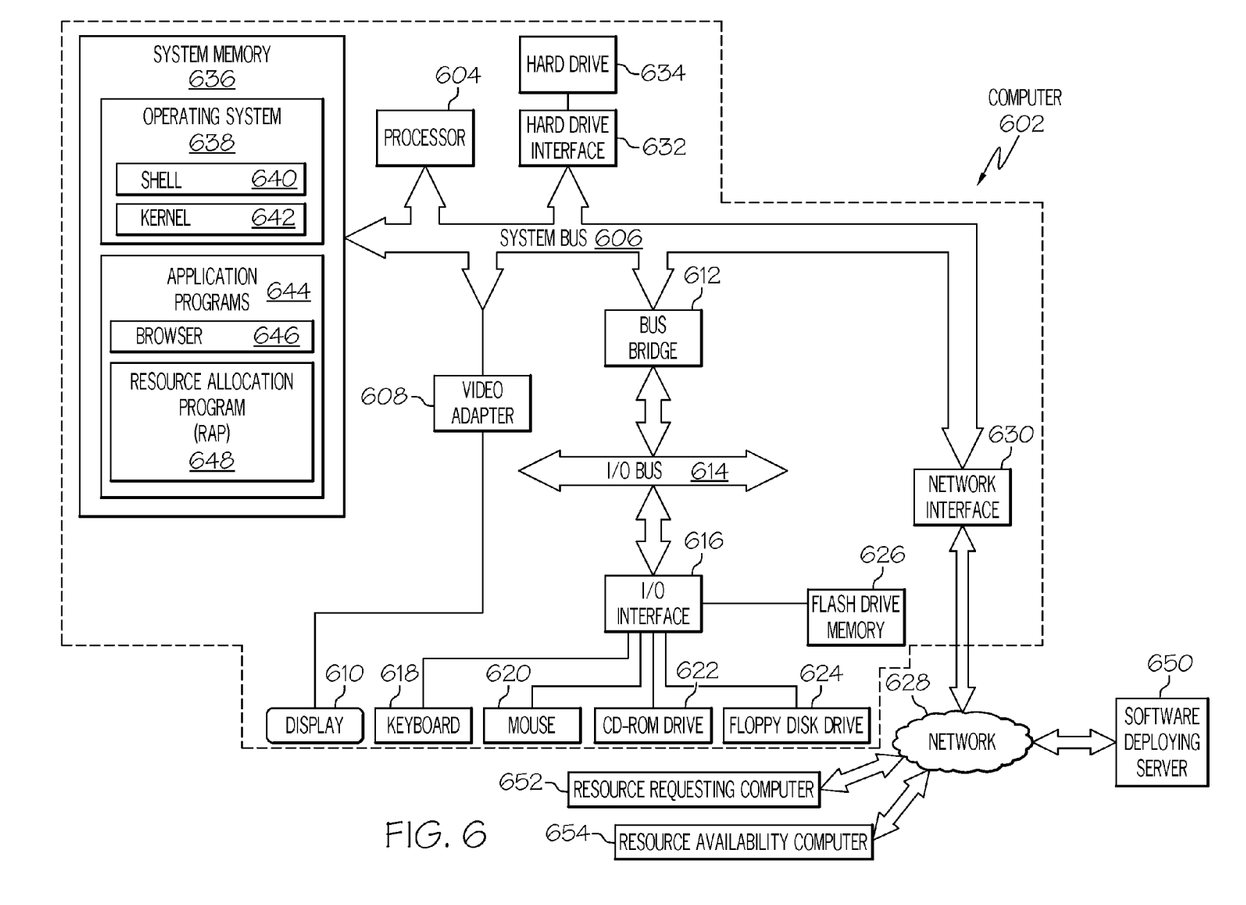
FIG. 6 illustrates an exemplary computer in which the present invention may be utilized.

With reference now to the figures, and in particular to FIG. 6, there is depicted a block diagram of an exemplary computer 602, which may be utilized by the present disclosure. Computer 602 includes a processor unit 604 that is coupled to a system bus 606. Processor unit 604 may utilize one or more processors, each of which has one or more processor cores. A video adapter 608, which drives/supports a display 610, is also coupled to system bus 606. System bus 606 is coupled via a bus bridge 612 to an input/output (I/O) bus 614. An I/O interface 616 is coupled to I/O bus 614. I/O interface 616 affords communication with various I/O devices, including a keyboard 618, a mouse 620, a media tray 622 (which may include storage devices such as CD-ROM drives, multi-media interfaces, etc.), a floppy disk drive 624, and flash drive memory 626. While the format of the ports connected to I/O interface 616 may be any known to those skilled in the art of computer architecture, in a preferred embodiment some or all of these ports are universal serial bus (USB) ports. Note that some or all of the architecture depicted for computer 602 may be utilized by software deploying computer 650, resource requesting computer 652, and/or resource availability computer 654.

As depicted, in one embodiment, computer 602 is optionally able to communicate via network 628 using a network interface 630. Network 628 may be an external network such as the Internet, or an internal network such as an Ethernet or a virtual private network (VPN).

A hard drive interface 632 is also coupled to system bus 606. Hard drive interface 632 interfaces with a hard drive 634. In a preferred embodiment, hard drive 634 populates a system memory 636, which is also coupled to system bus 606. System memory is defined as a lowest level of volatile memory in computer 602. This volatile memory includes additional higher levels of volatile memory (not shown), including, but not limited to, cache memory, registers and buffers. Data that populates system memory 636 includes computer 602's operating system (OS) 638 and application programs 644.

OS 638 includes a shell 640, for providing transparent user access to resources such as application programs 644. Generally, shell 640 is a program that provides an interpreter and an interface between the user and the operating system. More specifically, shell 640 executes commands that are entered into a command line user interface or from a file. Thus, shell 640, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 642) for processing. Note that while shell 640 is a text-based, line-oriented user interface, the present disclosure will equally well support other user interface modes, such as graphical, voice, gestural, etc.

As depicted, OS 638 also includes kernel 642, which includes lower levels of functionality for OS 638, including providing essential services required by other parts of OS 638 and application programs 644, including memory management, process and task management, disk management, and mouse and keyboard management.

Application programs 644 include a renderer, shown in exemplary manner as a browser 646. Browser 646 includes program modules and instructions enabling a world wide web (WWW) client (i.e., computer 602) to send and receive network messages to the Internet using hypertext transfer protocol (HTTP) messaging, thus enabling communication with software deploying server 650 and other described computer systems.

Application programs 644 also include a resource allocation program (RAP) 648, which, when executed, performs some or all of the processes described in FIGS. 1-5 and 7-8. In one embodiment, RAP 648 is downloadable from software deploying server 650 in an on-demand basis, such that units of code are downloaded only when needed. In another embodiment, some or all of the processes executed by RAP 648 are performed by software deploying server 650 itself, thus minimizing the use of resources within computer 602.

Resource requesting computer 652 may be affiliated with one or more particular work areas within an enterprise or a project. Similarly, resource availability computer 652 may be affiliated with one or more particular work areas within an enterprise or a project. Utilizing the methodology described herein, resources can be reallocated from an area associated with resource availability computer 652 to another area associated with resource requesting computer 652, while contemplating ramp-up indexes, affinity indexes, priorities, etc. described herein.

The hardware elements depicted in computer 602 are not intended to be exhaustive, but rather are representative to highlight essential components required by the present disclosure. For instance, computer 602 may include alternate memory storage devices such as magnetic cassettes, digital versatile disks (DVDs), Bernoulli cartridges, and the like. These and other variations are intended to be within the spirit and scope of the present disclosure.

Figure 7:
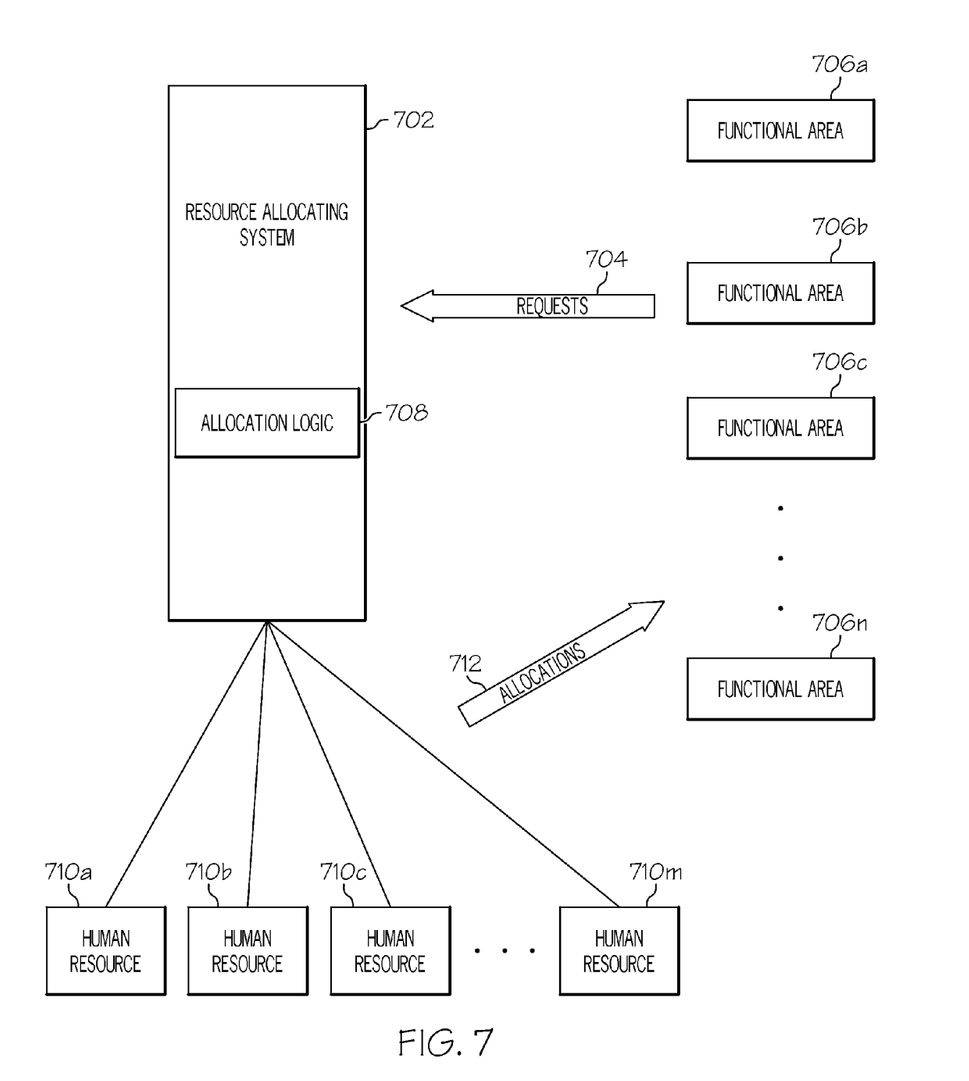
FIG. 7 depicts resources being allocated/reallocated to different activities areas within a software factory.

Referring now to FIG. 7, a relationship among a resource allocating system 702, multiple functional areas 706a-n (where "n" is an integer), and multiple resources 710a-m (where "m" is an integer) is presented. In one embodiment, resource allocating system 702 can be some or all of computer 602 shown in FIG. 6. Functional areas 706a-n can communicate with resource allocating system 702 via a resource requesting computer, such as resource requesting computer 652 shown in FIG. 6. The existence of resources 710a-m, or even the resources 710a-m themselves, can be made known by a resource computer such as resource availability computer 654 shown in FIG. 6. As depicted, resource allocating system 702 utilizes allocation logic 708 (e.g., RAP 648 shown in FIG. 6) to receive requests 704 for resources from functional areas 706a-n. In a manner described herein, these requests 704 may ultimately result in resource allocations 712, which allocations are also under the control and direction of allocation logic 708.

The present disclosure describes various embodiments of constructing the objective function and constraints that allow for simultaneous maintenance of the resources and application services at the current time and their development in future, including those resources and services needed by the software factory described above. Some of the considerations that are taken into account for resource allocation are: (a) as the demand profile for resources changes, there is a need to move the resources between functional areas or assembly centers to optimize resource utilization (minimize bench time); (b) rotate resources pro-actively to build up certain skill profiles of resources based on predicted future need; (c) functional area skills may be "sticky" i.e., specific functional areas have a ramp up period during which the ability of the people improves as they specialize in that functional area; and (d) highly productive resources may need to be treated differently since rotating such resources may have a heavy impact on overall productivity of other resources in the functional area. Thus, described herein is a method and system to balance the benefits of dynamic resource allocation against the benefits of resource specialization in certain functional areas. Depending on the expected variability in demand for resource skills, skill specific ramp-up time, current resource utilization levels by skill type, resource productivity level and expected resource turnover time (i.e., mean service length of a newly onboarded resource), the methodology described herein chooses an appropriate strategy for resource allocation.

In one embodiment of the present disclosure, Equation (1) shown above is reformulated to allow different treatment of expert/productive resources. This reformulation is represented below as Equation (2):

$$x(t)^* = \underset{\substack{c_i(x(t_j)) \geq 0 \\ V(x_k(t))P(x_k(t) \neq x_k(t-1)) = p_k(t)}}{\operatorname{argmin}} f(x(t-1), \ldots x(0)) \quad \text{Equation (2)}$$

In Equation (2), $V(x_k(t))$ represents the value of resource k at time t (which is by definition between 1 and infinity). In one embodiment of the present disclosure, this value is a function of productivity and skill set, among other things. Operator P( ) stands for probability. Finally $p_k(t)$ is the calculated dynamic probability of a movement for resource k at time t. The newly added constraint $V(x_k(t)) P(x_k(t) \neq x_k(t-1)) = p_k(t)$ states that as the value of a resource increases, the probability of any movement and re-allocation for that resource decreases. Conversely, for resources with relatively low value, the probability of movement would be equal to the dynamic probability of movement at that time.

Another embodiment of the present disclosure is realized by reformulating Equation (1) to add a value for resource development. This reformation is represented in Equation (3):

$$x(t)^* = \underset{c_i(x(t_j)) \geq 0}{\operatorname{argmin}} f(x(t-1), \ldots x(0)) + c[s(x_k(t)) - s(x_k(t-1))] \quad \text{Equation (3)}$$

where $s(x_k(t))$ is the overall skill (a measure of development) of resource k at time t, and c is an appropriate weighting factor that may be a function of time among other things. In other words, Equation (3) allows a sub-optimal paining to happen in order to promote the development of resources for future profit.

Figure 8:
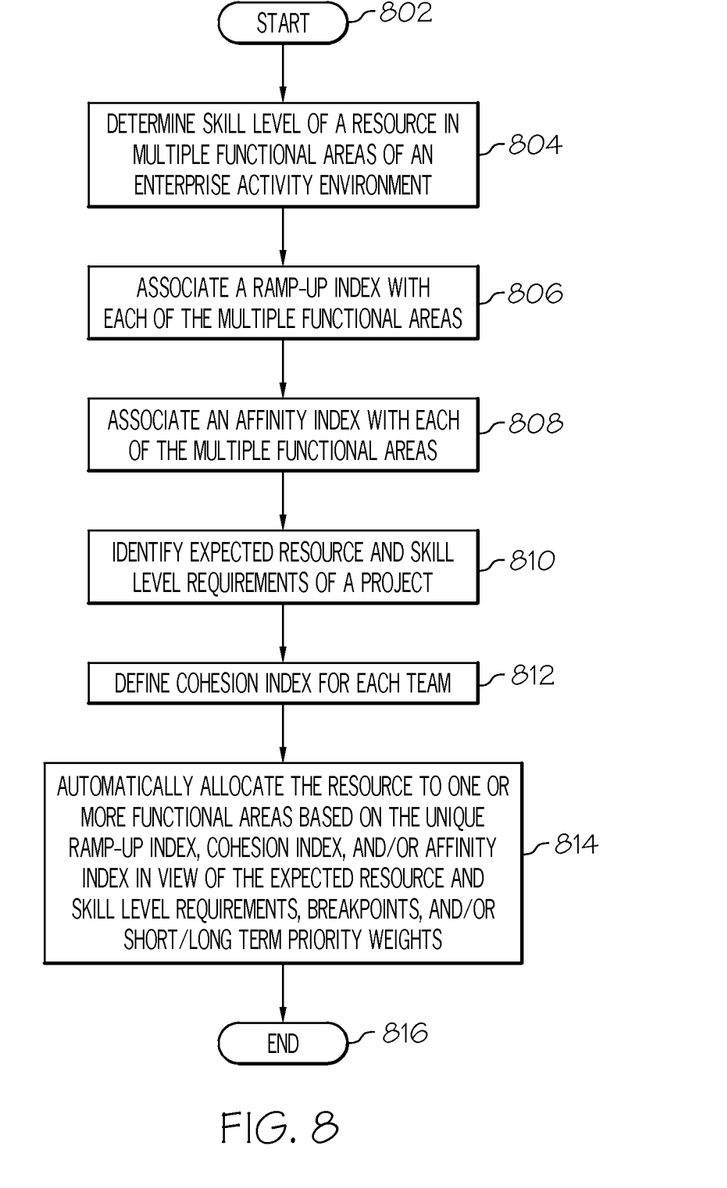
FIG. 8 is a high-level flow chart of one or more steps executed by a processor to allocate resources to one or more functional areas of an enterprise activity environment.

With reference now to FIG. 8, a high level flow chart of steps taken to allocate and/or reallocate resources to functional areas of an enterprise activity environment is presented. After initiator block 802, a determination is made of a skill level of a resource in multiple functional areas (block 804). This resource may be a computer, a storage device, a service (e.g., a service in a service oriented architecture—SOA), etc. However, in the embodiment described in exemplary manner herein, this resource is a person who has a specific skill level in each of the multiple functional areas. For example, the person may work on an assembly line in a software factory (described in detail above). Thus, the person has measurable skill levels in one or more of the positions on that assembly line. This skill level may be determined by and based on past performance by that person on previous projects. In addition (or alternatively), this skill level may be based on test results of tests administered to the person. Similarly, such prior evaluations/performance reviews/tests may be administered to any resource, including hardware, software, etc.

As depicted in block 806, a unique ramp-up index is created and associated with each of the multiple functional areas. Each unique ramp-up index is based on a rate of growth of the skill level for the resource as a function of time spent to develop a requisite skill level of the resource within each functional area. For example, assume again that the resource is a person. The ramp-up index is a measurement of how long it will take existing and/or new workers within a functional area (e.g., an assembly line) to raise their collective current skill levels up to a requisite skill level that has been predetermined according to a service level agreement with a customer, baseline tests, expected productivity based on past productivity within that functional area or one similar, etc.

As depicted in block 808, an affinity index is created and associated with each of the multiple functional areas. This affinity index is based on a level of productivity drop of other resources in a specific functional area if the resource is assigned to another functional area. For example, assume that the resource is an experienced worker who is known to not only be highly productive, but is also an excellent resource for other workers to approach with their own technical questions. If this experienced worker/mentor is removed from a first functional area to another functional area, then the productivity of the workers left behind in the first functional area will decline.

As described in block 810, expected resource and skill level requirements for a project are identified. For example, assume that the project is to deliver a new software package. The customer may have certain expectations regarding what level of expertise is held by workers on the project (skill level requirements) as well as how many persons will be assigned to the project (resource requirements).

As described in block 812, a cohesion index for each team is defined. A cohesion index is similar to an affinity index, except that the cohesion index is based solely on personnel disruption, whether that disruption is caused by adding or removing a team member. That is, the affinity index describes how disruptive it will be to a team to remove a key team member. However, adding a team member, even a worker who is highly skilled, may be just as disruptive to a team. This disruption can be due to a variety of factors, including interpersonal issues, a time zone difference for the new team member, logistical issues (i.e., finding workspace, resources, computing time, etc. for the new team member), etc. Thus, if a team is highly performing, then they should not be disrupted by adding a new team member, and will have a high cohesion index. However, if a team is performing poorly, then that team's cohesion index will be low.

As shown in block 814, based on these expected resource and skill level requirements, resources are automatically allocated to one or more of the functional areas based on the ramp-up index and the affinity index that were created and associated/assigned to the various functional areas as described in block 806-808, as further explained in exemplary manner in Equations (2)-(3) above, as well as the cohesion index described in block 812.

As stated further in block 814, in one embodiment the resources are allocated/reallocated by determining a predicted breakpoint for reassigning an existing resource. This predicted breakpoint defines a point in time at which lost productivity caused by removing the existing resource from a first functional area is equally offset by increased productivity in a second functional area to which the existing resource is now assigned. Thus, assume that removing a worker from a first area results in some measureable reduction in productivity (e.g., a reduced amount of software code being written) in the first area. The transferred worker will cause an increase in productivity in the second area to which she has been transferred. However, there will be a ramping-up period for that transferred worker, during which time her productivity will increase. At some point, the level of decreased production in the first area will be equal to, or preferably surpassed by, an increased level of production in the second area to which she was transferred. How long it takes to reach this breakpoint can be compared to a predicted/acceptable breakpoint, which may be dependent on the length of the project on which the worker is working. Thus, if the project is five years long, then a breakpoint date of six months may be acceptable, assuming that transferring the worker will result in long-term gain in her productivity. However if the project is only three months long but the breakpoint date is still six months after the transfer, then there will be a net loss in overall productivity, and thus the transfer will not take place.

As stated further in block 814, in one embodiment the resources are allocated/reallocated by the processor assigning a short term priority weight to short term needs of a particular functional area and a long term priority weight to long term needs of the particular functional area. The short term priority weight describes a first priority level for short term activities in the particular functional area. The long term priority weight describes a second priority level for long term activities in the particular functional area. For example, assume that transferring a resource from a first area to a second area will result in the first area having reduced productivity due to that transfer, while the second area will have increased productivity. If long-term activities of the second area have been deemed to be more important than short-term activities of the first area, then the worker will be transferred to the second area. However, if short-term activities of the first area have been deemed to be more important than long-term activities of the second area, then the worker will be not be transferred, and will remain in the first area (or another area having a higher priority weight). These priority weights can be based on one or more factors. In one embodiment, a factor considered in the creation of a priority weight for an area is based on whether or not that area is "mission critical". Thus, certain areas produce portions/aspects of the total job that are essential to the success/functionality of the project. Such critical areas may be assigned to produce core lines of code for a software project (e.g., code that handles the main and/or unique aspect of the project); to provide critical hardware components (e.g., processing power and/or memory capacity), etc. Other areas, however, may be deemed less important, such as areas that create software code for add-on functionalities that are not critical to the project, hardware such as input/output devices that are not immediately needed to deploy the project, etc. Thus, based on which area has a higher priority weight, the resource/worker will be assigned accordingly. In one embodiment, this priority weight, including the higher priority weight, is based on a ramp-up index and an affinity index. That is, the priority weight is based in part on the ramp-up index and/or affinity index described above. For example, assume that a certain area is initially deemed to have a low priority weight. However, if that certain area has a high ramp-up index and/or a high affinity index, then its priority weight is raised accordingly, thus making it less vulnerable to worker raids from other areas.

The process ends at terminator block 816.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method for automated allocation of resources to functional areas of an enterprise activity environment, the computer implemented method comprising:
   a processor determining a skill level of a resource in multiple functional areas, wherein the resource has a specific skill level in each of the multiple functional areas;
   the processor creating and associating a unique ramp-up index with each of the multiple functional areas, wherein each unique ramp-up index is based on a rate of growth of the skill level for the resource as a function of time spent to develop a requisite skill level of the resource within each functional area;
   the processor creating and associating an affinity index with each of the multiple functional areas, wherein the affinity index is based on a level of productivity drop of other resources in a specific functional area if the resource is assigned to another functional area;
   the processor identifying expected resource and skill level requirements of a project; and
   the processor automatically allocating the resource to one or more functional areas based on the unique ramp-up index and affinity index associated with a particular functional area in view of the expected resource and skill level requirements.

2. The computer implemented method of claim 1, wherein each unique ramp-up index is further based on current skill levels within said each functional area.

3. The computer implemented method of claim 2, wherein the ramp-up index is further based on a past productivity measured for said each functional area.

4. The computer implemented method of claim 1, wherein the enterprise activity environment is a software factory, and wherein said each functional area is a work station within the software factory.

5. The computer implemented method of claim 1, further comprising:
   the processor determining a predicted breakpoint for reassigning an existing resource, wherein the predicted breakpoint defines a point in time at which lost productivity caused by removing the existing resource from a first functional area is equally offset by increased productivity in a second functional area to which the existing resource is now assigned;
   the processor determining an acceptable breakpoint based on a length of the project; and
   the processor reassigning the existing resource from the first functional area to the second functional area only if the predicted breakpoint does not exceed the acceptable breakpoint.

6. The computer implemented method of claim 1, further comprising:
   the processor assigning a short term priority weight to short term needs of a particular functional area and a long term priority weight to long term needs of the particular functional area, wherein the short term priority weight describes a first priority level for short term activities in the particular functional area, and wherein the long term priority weight describes a second priority level for long term activities in the particular functional area;
the processor determining a higher priority weight by comparing the short term priority weight to the long term priority weight; and
the processor reallocating resources based on the higher priority weight.

7. The computer implemented method of claim 6, wherein the higher priority weight is based on the unique ramp-up index, a cohesion index, and the affinity index, wherein the cohesion index describes how sensitive a productivity of a team is to worker reassignments.

8. The computer implemented method of claim 1, wherein the skill level of the resource is based on past performance by the resource on previous projects.

9. The computer implemented method of claim 1, wherein the skill level of the resource is based on test results of tests administered to the resource.

10. The computer implemented method of claim 1, wherein the resource is a person.

11. The computer implemented method of claim 10, wherein the skill level of the resource is based on a self-assessed skill level of the person.

12. The computer implemented method of claim 10, wherein the skill level of the resource is based on a peer-assessed skill level of the person.

13. A computer program product for automated allocation of resources to functional areas of an enterprise activity environment, the computer program product comprising:
a computer readable storage media;
first program instructions to determine a skill level of a resource in multiple functional areas, wherein the resource has a specific skill level in each of the multiple functional areas;
second program instructions to associate a unique ramp-up index with each of the multiple functional areas, wherein each unique ramp-up index is based on a rate of growth of the skill level for the resource as a function of time spent to develop a requisite skill level of the resource within each functional area;
third program instructions to associate an affinity index with each of the multiple functional areas, wherein the affinity index is based on a level of productivity drop of other resources in a specific functional area if the resource is assigned to another functional area;
fourth program instructions to identify expected resource and skill level requirements of a project; and
fifth program instructions to automatically allocate the resource to one or more functional areas based on the unique ramp-up index and affinity index associated with a particular functional area in view of the expected resource and skill level requirements; and wherein
the first, second, third, fourth, and fifth program instructions are stored on the computer readable storage media.

14. The computer program product of claim 13, wherein the enterprise activity environment is a software factory, and wherein said each functional area is a work station within the software factory.

15. The computer program product of claim 13, further comprising:
sixth program instructions to determine a predicted breakpoint for reassigning an existing resource, wherein the predicted breakpoint defines a point in time at which lost productivity caused by removing the existing resource from a first functional area is equally offset by increased productivity in a second functional area to which the existing resource is now assigned;
seventh program instructions to determine an acceptable breakpoint based on a length of the project; and
eighth program instructions to reassign the existing resource from the first functional area to the second functional area only if the predicted breakpoint does not exceed the acceptable breakpoint; and wherein
the sixth, seventh, and eighth program instructions are stored on the computer readable storage media.

16. A computer system comprising:
a central processing unit (CPU), a computer readable memory, and a computer readable storage media;
first program instructions to determine a skill level of a resource in multiple functional areas, wherein the resource has a specific skill level in each of the multiple functional areas;
second program instructions to associate a unique ramp-up index with each of the multiple functional areas, wherein each unique ramp-up index is based on a rate of growth of the skill level for the resource as a function of time spent to develop a requisite skill level of the resource within each functional area;
third program instructions to associate an affinity index with each of the multiple functional areas, wherein the affinity index is based on a level of productivity drop of other resources in a specific functional area if the resource is assigned to another functional area;
fourth program instructions to identify expected resource and skill level requirements of a project; and
fifth program instructions to automatically allocate the resource to one or more functional areas based on the unique ramp-up index and affinity index associated with a particular functional area in view of the expected resource and skill level requirements; and wherein
the first, second, third, fourth, and fifth program instructions are stored on the computer readable storage media for execution by the CPU via the computer readable memory.

17. The computer system of claim 16, wherein each unique ramp-up index is further based on current skill levels within said each functional area.

18. The computer system of claim 16, wherein the enterprise activity environment is a software factory, and wherein said each functional area is a work station within the software factory.

19. The computer system of claim 16, further comprising:
sixth program instructions to determine a predicted breakpoint for reassigning an existing resource, wherein the predicted breakpoint defines a point in time at which lost productivity caused by removing the existing resource from a first functional area is equally offset by increased productivity in a second functional area to which the existing resource is now assigned;
seventh program instructions to determine an acceptable breakpoint based on a length of the project; and
eighth program instructions to reassign the existing resource from the first functional area to the second functional area only if the predicted breakpoint does not exceed the acceptable breakpoint; and wherein
the first, second, third, fourth, and fifth program instructions are stored on the computer readable storage media for execution by the CPU via the computer readable memory.

20. The computer system of claim 16, further comprising:
sixth program instructions to assign a short term priority weight to short term needs of a particular functional area and a long term priority weight to long term needs of the particular functional area, wherein the short term priority weight describes a first priority level for short term activities in the particular functional area, and wherein the long term priority weight describes a second priority level for long term activities in the particular functional area;

seventh program instructions to determine a higher priority weight by comparing the short term priority weight to the long term priority weight; and eighth program instructions to reallocate resources based on the higher priority weight; and wherein the first, second, third, fourth, and fifth program instructions are stored on the computer readable storage media for execution by the CPU via the computer readable memory.

* * * * *